Figure 1:
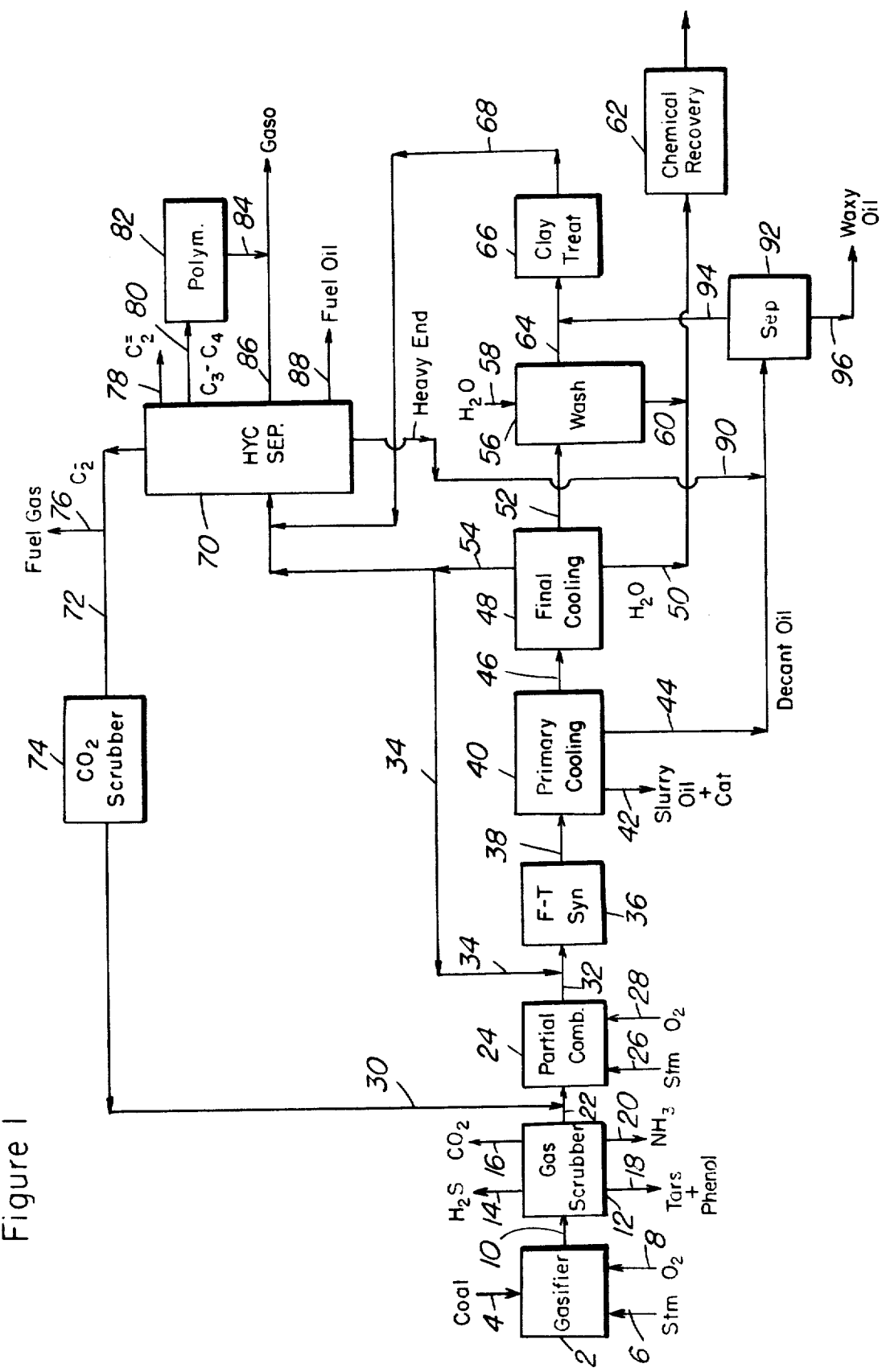

United States Patent [19]

Kuo

[11] 4,046,831
[45] Sept. 6, 1977

[54] METHOD FOR UPGRADING PRODUCTS OF FISCHER-TROPSCH SYNTHESIS

[75] Inventor: James C. Kuo, Cherry Hill, N.J.

[73] Assignee: Mobil Oil Corporation, New York, N.Y.

[21] Appl. No.: 614,585

[22] Filed: Sept. 18, 1975

[51] Int. Cl.$^2$ ............................................. C07C 1/04
[52] U.S. Cl. .................................. 260/676 R; 208/79;
  208/88; 208/93; 208/120; 208/135; 260/449 R;
  260/450
[58] Field of Search ............. 260/676, 449 R, 449 M,
  260/449.5, 449.6, 450; 208/57, 64, 79, 88, 93

[56] References Cited

U.S. PATENT DOCUMENTS

| 2,740,804 | 4/1956 | Glazier ................... 260/450 |
| 2,752,382 | 6/1956 | Garrett et al. ............ 260/450 |
| 3,172,842 | 3/1965 | Peterson .................. 208/79 |
| 3,700,585 | 10/1972 | Chen et al. ............... 208/111 |
| 3,729,409 | 4/1973 | Chen ..................... 208/135 |
| 3,843,510 | 10/1974 | Morrison et al. ........... 208/111 |
| 3,928,483 | 12/1975 | Chang et al. .............. 260/668 R |

OTHER PUBLICATIONS

Asinger, Paraffins Chemistry & Technology, Pergammon Press, N. Y. (1968), pp. 3, 123-125, 131, 132, 136, 138.

Primary Examiner—C. Davis
Attorney, Agent, or Firm—Charles A. Huggett; Carl D. Farnsworth

[57] ABSTRACT

The product effluent of a Fischer-Tropsch synthesis is subjected to cooling sufficient to separate a high boiling product fraction boiling above about 400° F from lower boiling product effluent material and comprising water product with formed oxygenates. The total lower boiling product effluent thus obtained is passed in contact with a special class of selective crystalline zeolite catalyst maintained under conditions to improve upon the hydrocarbon products contacted and convert oxygenates for hydrocarbons.

6 Claims, 2 Drawing Figures

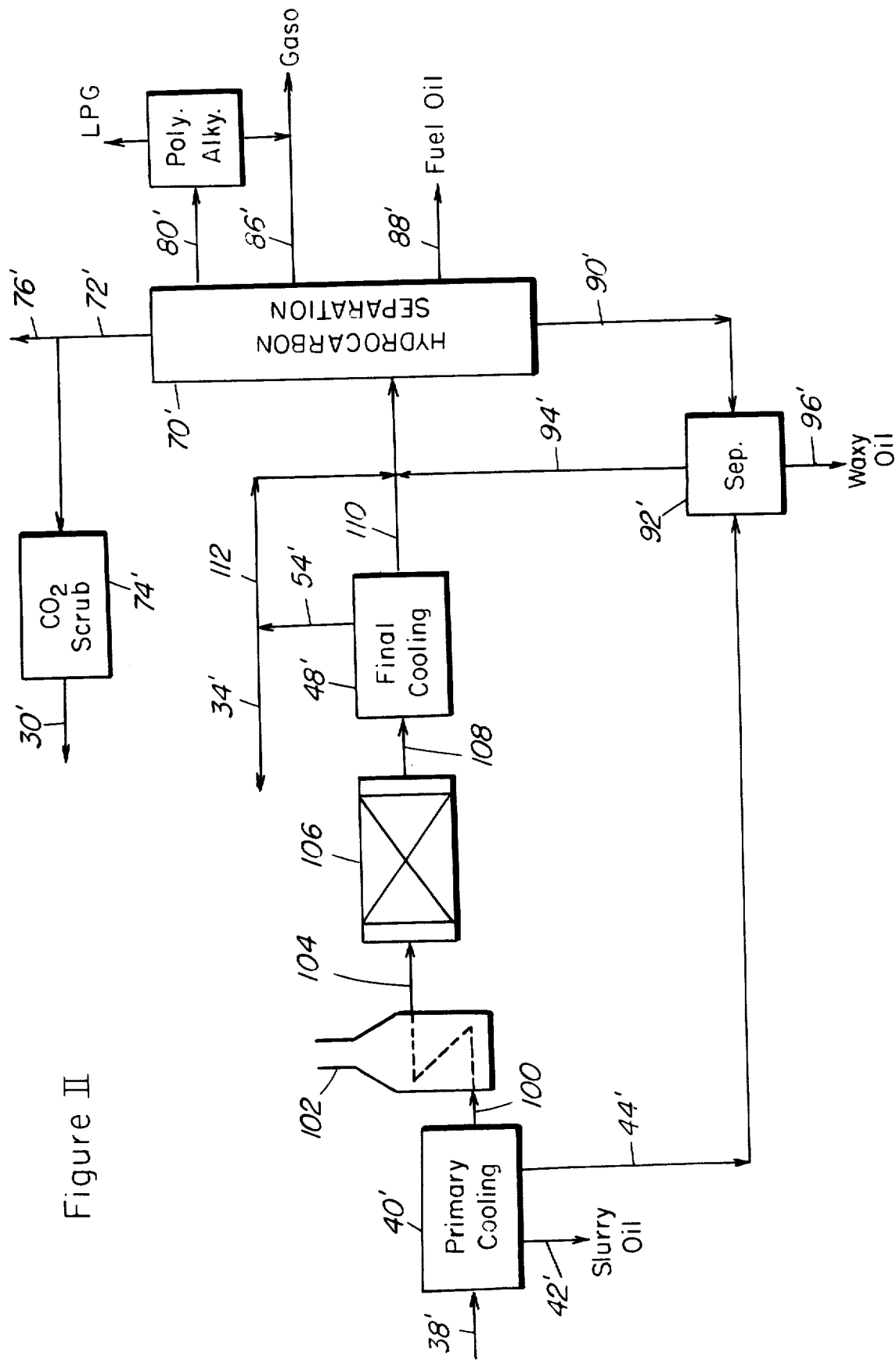
Figure II

METHOD FOR UPGRADING PRODUCTS OF FISCHER-TROPSCH SYNTHESIS

BACKGROUND OF THE INVENTION

1. Field of the Invention

This invention is concerned with a process for improving products of converting synthesis gas, i.e., mixtures of gaseous carbon oxides with hydrogen or hydrogen donors, to hydrocarbon mixtures and oxygenates. In one aspect, this invention is concerned with a process for increasing the yield of hydrocarbon mixtures rich in aromatic hydrocarbons over that obtained in a known Fischer-Tropsch synthesis process. In still another aspect, this invention is concerned with utilizing a novel class of crystalline zeolite catalysts for improving the products obtained by the conversion of synthesis gas.

2. Prior Art

Processes for the conversion of coal and other hydrocarbons such as natural gas to a gaseous mixture consisting essentially of hydrogen and carbon monoxide, or of hydrogen and carbon dioxide, or of hydrogen and carbon monoxide and carbon dioxide, are well known. Although various processes may be employed for the gasification, those of major importance depend either on the partial combustion of the fuel with an oxygen-containing gas or on a combination of these two reactions. An excellent summary of the art of gas manufacture, including synthesis gas, from solid and liquid fuels, is given in Encyclopedia of Chemical Technology, Edited by Kirk-Othmer, Second Edition, Volume 10, pages 353-433, (1966), Interscience Publishers, New York, N.Y., the contents of which are herein incorporated by reference. The techniques for gasification of coal or other solid, liquid or gaseous fuel are not considered to be per se inventive here.

It is considered desirable to effectively and more efficiently convert synthesis gas, and thereby coal and natural gas, to highly valued hydrocarbons such as motor gasoline with high octane number, petrochemical feedstocks, liquefiable petroleum fuel gas, and aromatic hydrocarbons. It is well known that synthesis gas will undergo conversion to form reduction products of carbon monoxide, such as hydrocarbons, at temperatures of from about 300° to about 850° F under pressures of from about 1 to 1,000 atmospheres pressure, over a fairly wide variety of catalysts. The Fischer-Tropsch process, for example, which has been most extensively studied, produces a range of products including liquid hydrocarbons, a portion of which have been used as low octane gasoline. The types of catalysts that have been studied for this and related processes include those based on metals or oxides of iron, cobalt, nickel, ruthenium, thorium, rhodium and osmium.

The wide range of catalysts and catalysts modifications disclosed in the art and an equally wide range of conversion conditions for the reduction of carbon monoxide by hydrogen provide considerable flexibility toward obtaining selected boiling-range products. Nonetheless, in spite of this flexibility, it has not proved possible to make such selections so as to produce liquid hydrocarbons in the gasoline boiling range which contain highly branched paraffins and substantial quantities of aromatic hydrocarbons, both of which are required for high quality gasoline, or to selectively produce aromatic hydrocarbons particularly rich in the benzene to xylenes range. A review of the status of this art is given in "Carbon Monoxide-Hydrogen Reactions," Encyclopedia of Chemical Technology, Edited by Kirk-Othmer, Second Edition, Volume 4, pp. 446–488, Interscience Publishers, New York, N.Y., the text of which is incorporated herein by reference.

Recently it has been discovered that synthesis gas may be converted to oxygenated organic compounds and these then converted to higher hydrocarbons, particularly high octane gasoline, by contacting the synthesis gas with a carbon monoxide reduction catalyst followed by contacting the conversion products so produced with a special class of crystalline zeolite catalyst in a separate reaction zone. A two-stage conversion operation so directed is described in copending U.S. patent application, Ser. No. 387,220, filed on Aug. 9, 1973. Compositions of iron, cobalt or nickel deposited in the inner absorption regions of crystalline zeolites are described in U.S. Pat. No. 3,013,990. Attempts to convert synthesis gas over X-zeolite base exchanged with iron, cobalt and nickel are described in Erdol and Kohle - Erdgas, Petrochemie: Brennstoff - Chemie, Vol. 25, No. 4, pp. 187-188, April 1972.

SUMMARY OF THE INVENTION

This invention is concerned with improving the product distribution and yield of products obtained by a Fischer-Tropsch synthesis gas conversion process. In a particular aspect the present invention is concerned with improving the product yield, product distribution and operating economies of a synthesis gas conversion operation known in the industry as the Sasol process.

The Sasol process located in South Africa and built to convert an abundant supply of coal to particularly hydrocarbons, oxygenates and chemical forming components was a pioneering venture. The process complex developed is enormous, expensive to operate and may be conveniently divided or separated into (1) a synthesis gas preparation complex from coal, (2) a Fischer-Tropsch type of synthesis gas conversion in both a fixed catalyst bed operation and a fluid catalyst bed operation, (3) a product recovery operation and (4) an auxiliary plant and utility operations required in such a complex.

The extremely diverse nature of the products obtained in the Fischer-Tropsch conversion operation such as obtained in the Sasol process amplifies the complexity of the overall process arrangement and its operating economics. The Fischer-Tropsch synthesis operation is known to produce a wide spectrum of products including fuel gas, light olefins, LPG, gasoline, light and heavy fuel oils, waxy oils and oxygenates identified as alcohols, acetone, ketones and acids, particularly acetic and proprionic acid. The $C_2$ and lower boiling components of the process may be reformed to carbon monoxide and hydrogen or the $C_2$ formed hydrocarbons and methane may be combined and blended for use in a fuel gas pipeline system.

The water soluble oxygenates and chemicals are recovered as by steam stripping and separated into individual components with the formed organic acids remaining in the water phase separately treated. Propylene and butylene formed in the process are converted to gasoline boiling components as by polymerization in the presence of a phosphoric acid catalyst. Propane and butane on the other hand are used for LPG. The lower alcohols are recovered and used to form desired chemicals such as ethylene.

The present invention is concerned with improving a Fischer-Tropsch synthesis gas conversion operation by improving the product selectively and product characteristics obtained therefrom.

FIG. I is a condensed schematic block flow arrangement of a typical Fischer-Tropsch synthesis process directed to the conversion of coal to synthesis gas comprising carbon monoxide and hydrogen, the reduction of carbon monoxide by the Fischer-Tropsch Process to form a product mixture comprising hydrocarbon and oxygenates and the recovery of these products for further use.

FIG. II is a condensed schematic block flow arrangement for improving the process of FIG. I by employing the concepts of the present invention.

Referring now to FIG. I, there is shown in block flow arrangement a substantially reduced process flow arrangement of a Fischer-Tropsch syngas conversion process. A coal gasifier section 2 is provided to which pulverized coal is introduced by conduit 4, steam by conduit 6 and oxygen by conduit 8. The products of gasifier section 2 are then passed by conduit 10 to a gas scrubber section 12. In scrubber section 12, carbon monoxide and hydrogen are separated from hydrogen sulfide removed by conduit 14, carbon dioxide removed by conduit 16, tars and phenols removed by conduit 18 and ammonia removed by conduit 20. The carbon monoxide-hydrogen rich gas is passed from section 12 by conduit 22 to a partial combustion zone 24 supplied with steam by conduit 26 and oxygen by conduit 28. Recycle $C_2$ fuel gas product of the combination process separated from carbon dioxide is recycled by conduit 30 to the partial combustion section 24. In the partial combustion operation of section 24, a carbon monoxide-hydrogen synthesis gas of desired ratio is formed for passage and use in a downstream Fischer-Tropsch synthesis gas conversion operation.

The synthesis gas prepared as above briefly identified is passed by conduit 32 to a Fischer-Tropsch synthesis reaction section 36 containing a synthesis catalyst in admixture with $C_2$ recycle gas introduced by conduit 34. Generally the synthesis gas feed is introduced at a temperature of about 160° C and at an elevated pressure of about 365 psig. The temperature of the synthesis gas passed in contact with catalyst in a fluid catalyst operation rapidly rises by the exothermic heat liberated so that the Fischer-Tropsch and water gas shift reactions take place. The products of the Fischer-Tropsch synthesis reactions are conveyed by conduit 38 to a primary cooling section 40 wherein the temperature of the mixture is reduced to within the range of 280° to about 400° F. In the primary cooling section a separation is made at a temperature which permits the recovery of a slurry oil with entrained catalyst fines as by conduit 42, and a decant oil stream boiling above about 400° F by conduit 44. In one typical operation, the decant oil stream will have an ASTM/95% boiling point of about 490° F. A light oil stream boiling below about 500° F and more usually below about 450° F including lower boiling gaseous components and water containing oxygenates is passed by conduit 46 to a second or final cooling and separating section 48 maintained at a temperature of about 100° F and an elevated pressure of about 265 psig. In Section 48 a separation is made to recover a water phase comprising water soluble chemicals and oxygenates withdrawn by conduit 50, a light hydrocarbon oil phase comprising hydrocarbon and entrained oxygenates boiling from about $C_5$ hydrocarbons up to 400° F and as high as about 500° F boiling hydrocarbons withdrawn by conduit 52. A vaporous phase rich in $C_5$ hydrocarbon and comprising lower boiling gaseous components including $C_2$ to $C_4$ hydrocarbon are withdrawn by conduit 54. The vaporous phase also comprising unreacted carbon monoxide and hydrogen may be recycled by conduit 34 to the Fischer-Tropsch unit 36. In a typical operation about one volume of fresh feed is used with two volumes of the recycle gas. The lighter hydrocarbons do not completely condense and an absorber system is used for their recovery. Methane and LPG hydrocarbons are blended with other components for use in a pipe line system where desired. On the other hand they may be passed to a gas reforming section for conversion to synthesis gas and recycle as feed gas in the synthesis operation. The light oil hydrocarbon phase with entrained oxygenates in conduit 52 is passed through a water wash section 56 to which wash water is added by conduit 58 to remove water soluble oxygenate components. In wash section 56, water soluble oxygenates are removed and withdrawn therefrom by conduit 60. The water phases in conduits 50 and 60 are combined and passed to a chemicals recovery operation 62. The washed hydrocarbon phase is removed by conduit 64 and passed to a clay treater 66 along with a hydrocarbon fraction boiling below about 600° F recovered from the decanted oil phase in conduit 44 and a heavy oil product fraction recovered as hereinafter described. The hydrocarbon phase thus recovered and passed to this clay treating section is preheated to an elevated temperature of about 600° F before contacting a silica/alumina catalyst or clay composition retained in treater 66. This operation converts retained oxygenates and some alpha olefins in the hydrocarbon product thereby imparting a higher octane rating to gasoline material in these materials. The treatment also operates to remove harmful acids and other oxygenates retained in the hydrocarbon phase after the water wash. The clay treated hydrocarbon product is then passed by conduit 68 to a hydrocarbon separation reaction 70. A portion of the hydrocarbon vapors in conduit 54 not directly recycled to the Fischer-Tropsch conversion operation by conduit 34 is also passed to the hydrocarbon separation reaction 70. In the hydrocarbon separation section 70, a separation is made to recover a flue gas stream comprising $C_2$ hydrocarbons and other components suitable for reforming to CO and $H_2$ withdrawn by conduit 72. A portion of this material is passed through a $CO_2$ scrubber 74 before recycle by conduit 30 to the partial combustion zone 24. A portion of the fuel gas may be withdrawn for other use by conduit 76. In separation section 70, a $C_2$ olefin rich stream is recovered by conduit 78 for chemical processing as desired. A $C_3$ to $C_4$ rich hydrocarbon stream is withdrawn by conduit 80 and passed to catalytic polymerization in section 82. Polymerized material suitable for blending with gasoline product is withdrawn by conduit 84. A synthetic gasoline product fraction or naphtha of low octane is recovered by conduit 86 and a light fuel oil product such as a No. 2 fuel oil is withdrawn by conduit 88 and a heavier oil fraction is withdrawn by conduit 90 for admixture with the decant oil fraction in conduit 44. The blend of hydrocarbon product thus formed in conduit 44 and passed to separator 92 will boil in the range of about 400° to about 1000° F. This material blend is passed to separator section 92 wherein a separation is made to recover a fraction boiling in the range of from about 400° to 650° F withdrawn by conduit 94 from a heavier waxy oil withdrawn by conduit 96.

In this relatively complicated synthesis gas conversion operation and product recovery system, it is not unusual to recover a product distribution comprising 2% ethylene, 8% LPG, 70% gasoline boiling material, 3% fuel oil, 3% waxy oil and about 14% of materials defined as oxygenates.

The combination operation above described and comprising a Fischer-Tropsch synthesis gas processing operation may be significantly improved by the present invention with respect to product quality composition and yield. In addition, the process may be simplified to substantially reduce the operating costs of such a complex operation.

FIG. II is a diagrammatic block flow sketch in elevation of a combination operation designed for improving the processing arrangement of FIG. I.

Referring now to FIG. II the total product effluent stream of the Fischer-Tropsch synthesis gas operation recovered by conduit 38' is passed to a primary cooling section 40' similar to that described with respect to FIG. I wherein cooling is provided sufficient for a separation to recover a high boiling slurry oil containing catalyst fines which is removed therefrom by conduit 42' from a decant oil fraction boiling above about 400° F which is recovered by conduit 44' and passed to a separator 92'. Material lower boiling than the decant oil fraction and comprising material boiling at least about 400° F is withdrawn by conduit 100. This feed is generally identified in Table 1 below.

TABLE 1

| Feed | Wt % |
|---|---|
| $N_2$ | 16 |
| $H_2$ | 2.5 |
| CO | 2 |
| $CO_2$ | 32 |
| $CH_4$ | 17 |
| $H_2O$ | 8 |
| $C_2$ plus material | 21 |
| Oxygenates | 1.1 |
| $C_5$-400° F, R + O | 55 |
| $C_4^=$ in C plus material | 7.7 |
| i-C in C plus material | 0 |

The oxygenates have been identified as comprising:

ESTIMATED PRODUCTION OF ORGANIC CHEMICALS

Acetaldehyde
Propionaldehyde
Acetone
Methanol
Methyl ethyl ketone
Ethanol
n-Propyl alcohol
n-Butyl alcohol
n-Amyl alcohol
Acetic acid
Propionic
Butyric acid
Methyl propyl ketone The combination of material above identified and comprising stream 100 is passed through furnace 102 wherein it is heated to a temperature within the range of 600° to 850° F. The thus heated combination of synthesis product material is then passed by conduit 104 to reactor 106. In reactor 106, the feed material contacts a special class of crystalline zeolites herein described and represented by a a ZSM-5 crystalline zeolite maintained as a fixed or fluid bed of catalyst. Reactor 106 is maintained at an operating temperature within the range of 600° to 850° F and a pressure within the range of 200 to 400 psig. The product of the crystalline zeolites conversion operation is withdrawn by conduit 108. In this zeolite catalyst conversion operation, the synthetic naphtha product is octane improved and oxygenates are converted to hydrocarbon.

The raw product recovered by conduit 108 is generally identified in Table 2 below.

TABLE 2

| EFFLUENT | Wt % |
|---|---|
| $N_2$ | 16 |
| $H_2$ | 2.5 |
| CO | 2 |
| $CO_2$ | 32 |
| $CH_4$ | 17 |
| $H_2O$ | 8.3 |
| $C_2$ | 22 |
| Oxygenates | 0.1 |
| $C_5$-400 F, R + O | 92 |
| $C_4^=$ in C | 1 |
| i-$C_4$ in $C_2$+ | 1.2 |

It will be noted when comparing the compositions represented in Tables 1 and 2 that the product discharged from reactor 106 has a lower amount of oxygenates, a higher octane number and a higher percentage of isobutane. Furthermore, the olefins in the $C_2$ plus product is much lower after processing over the crystalline zeolite. The light olefins ($C_2$-$C_4$) in the charge are substantially converted to a heavier $C_5$ plus fraction in the product to give a hydrocarbon product richer in the $C_5$-400° F gasoline fraction.

The product material in conduit 108 is then passed to a final cooling zone 48' maintained at a temperature of about 100° F and a pressure of about 265 psig. In the final cooling zone of section 48' a vaporous material is separated and removed by conduit 54' for recycle to the Fischer-Tropsch synthesis step of the process by conduit 34' as discussed with respect to FIG. I. The liquid portion of the product effluent is passed by conduit 110 to a hydrocarbon product separation section 70'. A portion of the vaporous material in conduit 54' may also be passed by conduit 112 to the product separation section 70'. This vaporous fraction will comprise $C_4$ and lower boiling components identified in Table 2 which may be further separated for processing as herein defined or recycled all or in part to the Fischer-Tropsch synthesis section by conduit 34'.

The decant oil fraction separated in the primary cooling step and boiling above about 400° F is passed to separation zone 92' wherein it is subjected to a stripping operation in the presence of product recycle material in conduit 90' to particularly recover hydrocarbon material boiling below about 650° F which is removed by conduit 94'. This recovered hydrocarbon fraction is then passed by conduit 94' to the hydrocarbon separation operation 70'. High boiling waxy material separated in the stripping operation from lower boiling material is removed therefrom by conduit 96' for further processing as desired.

In separation section 70' the products introduced thereto as above defined are separated to recover a fuel gas as by conduit 72', thereafter processed as discussed with respect to FIG. I. A stream comprising primarily $C_3$-$C_4$ rich hydrocarbons is recovered by conduit 80'. In the event the operating conditions for the crystalline zeolite conversion promote the promotion of olefins and isobutane as shown in Table 2 the product stream resulting from passing vaporous material by conduit 112 to separation section 70' may be passed to an alkylation operation. On the other hand, in the absence of sufficient isobutane, this stream may be passed to polymerization for formation of gasoline boiling components which is separately recovered from LPG gaseous material. A gasoline boiling product stream is recovered by conduit 86'. This gasoline product stream is identified as having an unleaded octane of about 92 in yields higher than that produced by the Fischer-Tropsch synthesis operation herein discussed. A fuel oil product such as a No. 2 fuel oil is recovered by conduit 88'. A high boiling product falling outside the No. 2 fuel oil boiling range is withdrawn by conduit 90'.

The special zeolite catalysts referred to herein utilize members of a special class of zeolites exhibiting some unusual properties. These zeolites induce profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents, i.e., high silica to alumina ratios, they are very active even with silica to alumina ratios exceeding 30. This activity is surprising since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g., of the X and A type. Furthermore, carbonaceous deposits, when formed, may be removed by burning at higher than usual temperatures to restore activity. In many environments, the zeolites of this class exhibit very low coke forming capability, conducive to very long times on stream between burning regenerations.

An important characteristic of the crystal structure of this class of zeolites is that it provides constrained access to, and egress from, the intra-crystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolites useful as catalysts in this invention possess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e., they exhibit "hydrophobic" properties. It is believed that this hydrophobic character is advantageous in the present invention.

The zeolites useful as catalysts in this invention freely sorb normal hexane and have a pore dimension greater than about 5 Angstroms. In addition their structure must provide constrained access to some larger molecules. It is sometimes possible to judge from a known crystal structure whether such constrained access exists. For example, if the only pore windows in a crystal are formed by eight-membered rings of oxygen atoms, then access by molecules of larger cross-section than normal hexane is substantially excluded and the zeolite is not of the desired type. Zeolites with windows of 10-membered rings are preferred, although excessive puckering or pore blockage may render these zeolites substantially ineffective. Zeolites with windows of 12-membered rings do not generally appear to offer sufficient constraint to produce the advantageous conversions desired in the instant invention, although structures can be conceived, due to pore blockage or other cause, that may be operative.

Rather than attempt to judge from crystal structure whether or not a zeolite possesses the necessary constrained access, a simple determination of the "constraint index" may be made by continuously passing a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F for at least 15 minutes. The zeolite is then flushed with helium and the temperature adjusted between 550° and 950° F to give an overall conversion between 10 and 60%. The mixture of hydrocarbons is passed at 1 liquid hourly space velocity (i.e., 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The constraint index is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Catalysts suitable for the present invention are those which employ a zeolite having a constraint index from 1.0 to 12.0. Constraint Index (CI) values for some typical zeolites including some not within the scope of this invention are:

| CAS | C.I. |
|---|---|
| ZSM-5 | 8.3 |
| ZSM-11 | 8.7 |
| ZSM-35 | 4.5 |
| TMA Offretite | 3.7 |
| ZSM-12 | 2 |
| ZSM-38 | 2 |
| Beta | 0.6 |
| ZSM-4 | 0.5 |
| Acid Mordenite | 0.5 |
| REY | 0.4 |
| Amorphous Silica-alumina | 0.6 |
| Erionite | 38 |

The above-described Constraint Index is an important and even critical, definition of those zeolites which are useful to catalyze the instant process. The very nature of this parameter and the recited technique by which it is determined, however, admit of the possibility that a given zeolite can be tested under somewhat different conditions and thereby have different constraint indexes. Constraint Index seems to vary somewhat with severity of operation (conversion). Therefore, it will be appreciated that it may be possible to so select test conditions to establish multiple constraint indexes for a particular given zeolite which may be both inside and outside the above defined range of 1 to 12.

Thus, it should be understood that the Constraint Index value as used herein is an inclusive rather than an exclusive value. That is, a zeolite when tested by any combination of conditions within the testing definition set forth herein above to have a constraint index of 1 to 12 is intended to be included in the instant catalyst definition regardless that the same identical zeolite tested under other defined conditions may give a constraint index value outside of 1 to 12.

The class of zeolites defined herein is exemplified by ZSM-5, ZSM-11, ZSM-12, ZSM-21, ZSM-35, ZSM-38 and other similar material. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference. U.S. patent application Ser. No. 358,192, filed May 7, 1973, and now abandoned, the entire contents of which are incorporated herein by reference, describes a zeolite composition, and a method of making such, designated as ZSM-21 which is useful in this invention. U.S. patent application Ser. No. 528,061 filed Nov. 29, 1974, the entire contents of which are incorporated herein by reference, describes a zeolite composition including a method of making it. This composition is designated ZSM-35 and is useful in this invention.

U.S. patent application Ser. No. 528,060, filed Nov. 29, 1974, and now abandoned, the entire contents of which are incorporated herein by reference, describes a zeolite composition including a method of making it. This composition is designated ZSM-38 and is useful in this invention.

The X-ray diffraction pattern of ZSM-21 appears to be generic to that of ZSM-35 and ZSM-38. Either or all of these zeolites is considered to be within the scope of this invention.

The specific zeolites described, when prepared in the presence of organic cations, are substantially catalytically inactive, possibly because the intracrystalline free space is occupied by organic cations from the forming solution. They may be activated by heating in an inert atmosphere at 1000° F for 1 hour, for example, followed by base exchange with ammonium salts followed by calcination at 1000 ° F in air. The presence of organic cations in the forming solution may not be absolutely essential to the formation of this special type zeolite; however, the presence of these cations does appear to favor the formation of this special type of zeolite. More generally, it is desirable to activate this type zeolite by base exchange with ammonium salts followed by calcination in air at about 1000° F for from about 15 minutes to about 24 hours.

Natural zeolites may sometimes be converted to this type zeolite by various activation procedures and other treatments such as base exchange, steaming, alumina extraction and calcination, alone or in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12, and ZSM-21, with ZSM-5 particularly preferred.

The zeolites used as catalysts in this invention may be in the hydrogen form or they may be base exchanged or impregnated to contain ammonium or a metal cation complement. It is desirable to calcine the zeolite after base exchange. The metal cations that may be present include any of the cations of the metals of Groups I through VIII of the periodic table. However, in the case of Group IA metals, the cation content should in no case be so large as to substantially eliminate the activity of the zeolite for the catalysis being employed in the instant invention. For example, a completely sodium exchanged H-ZSM-5 appears to be largely inactive for shape selective conversions required in the present invention.

In a preferred aspect of this invention, the zeolites useful as catalysts herein are selected as those having a crystal framework density, in the dry hydrogen form, of not substantially below about 1.6 grams per cubic centimeter. It has been found that zeolites which satisfy all three of these criteria are most desired. Therefore, the preferred catalysts of this invention are those comprising zeolites having a constraint index as defined above of about 1 to 12, a silica to alumina ratio of at least about 12 and a dried crystal density of not substantially less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire contents of which are incorporated herein by reference, is included in "Proceedings of the Conference on Molecular Sieves, London, April, 1967" published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, seems to be important as the locus of catalytic activity.

Crystal framework densities of some typical zeolites including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |

-continued

| Zeolite | Void Volume | Framework Density |
| --- | --- | --- |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

I claim:

1. A method for upgrading the product effluent of a Fischer-Tropsch synthesis gas operation comprising gaseous hydrocarbons, liquid hydrocarbons and oxygenates which comprises, cooling the product effluent of Fischer-Tropsch synthesis sufficient to separate a decant oil phase comprising the higher boiling hydrocarbon components of the Fischer-Tropsch effluent from a lower boiling phase comprising gaseous and liquid hydrocarbons and a water phase, heating the lower boiling phase to a temperature of at least about 500° F and passing the thus heated material in contact with a selective crystalline zeolite conversion catalyst selected from the class of crystalline zeolites represented by ZSM-5 maintained at a temperature within the range of 500° to 850° F, separating a product effluent of said crystalline zeolite conversion operation under conditions to recover a gaseous phase comprising $C_5$ and lower boiling material, a water phase and a hydrocarbon phase boiling above said gaseous phase and separating the hydrocarbon phase obtained from said zeolite conversion operation under conditions to recover LPG gaseous materials, a gasoline product and a light fuel oil product.

2. The method of claim 1 wherein the decant oil phase is separated to recover a waxy oil phase from a light fuel oil product.

3. The method of claim 1 wherein a $C_3$ to $C_4$ rich hydrocarbon fraction is recovered from the product of the crystalline zeolite conversion operation and are thereafter converted to gasoline boiling components by either catalytic polymerization or alkylation.

4. The method of claim 1 wherein a portion of the gaseous phase separated from the product effluent of the crystalline zeolite conversion operation is processed to produce LPG gaseous components and gasoline components.

5. The method of claim 4 wherein a portion of the materials comprising $C_3$ and $C_4$ hydrocarbon are catalytically converted to gasoline boiling components.

6. The method of claim 1 wherein oxygenates retained in the lower boiling phase processed over the crystalline zeolite conversion catalyst are converted to hydrocarbons boiling in the gasoline boiling range.

* * * * *